H. H. SOUTHWORTH & F. W. WOLF.
REFRIGERATING APPARATUS.
APPLICATION FILED OCT. 23, 1912.
1,139,460.
Patented May 11, 1915.
6 SHEETS—SHEET 2.
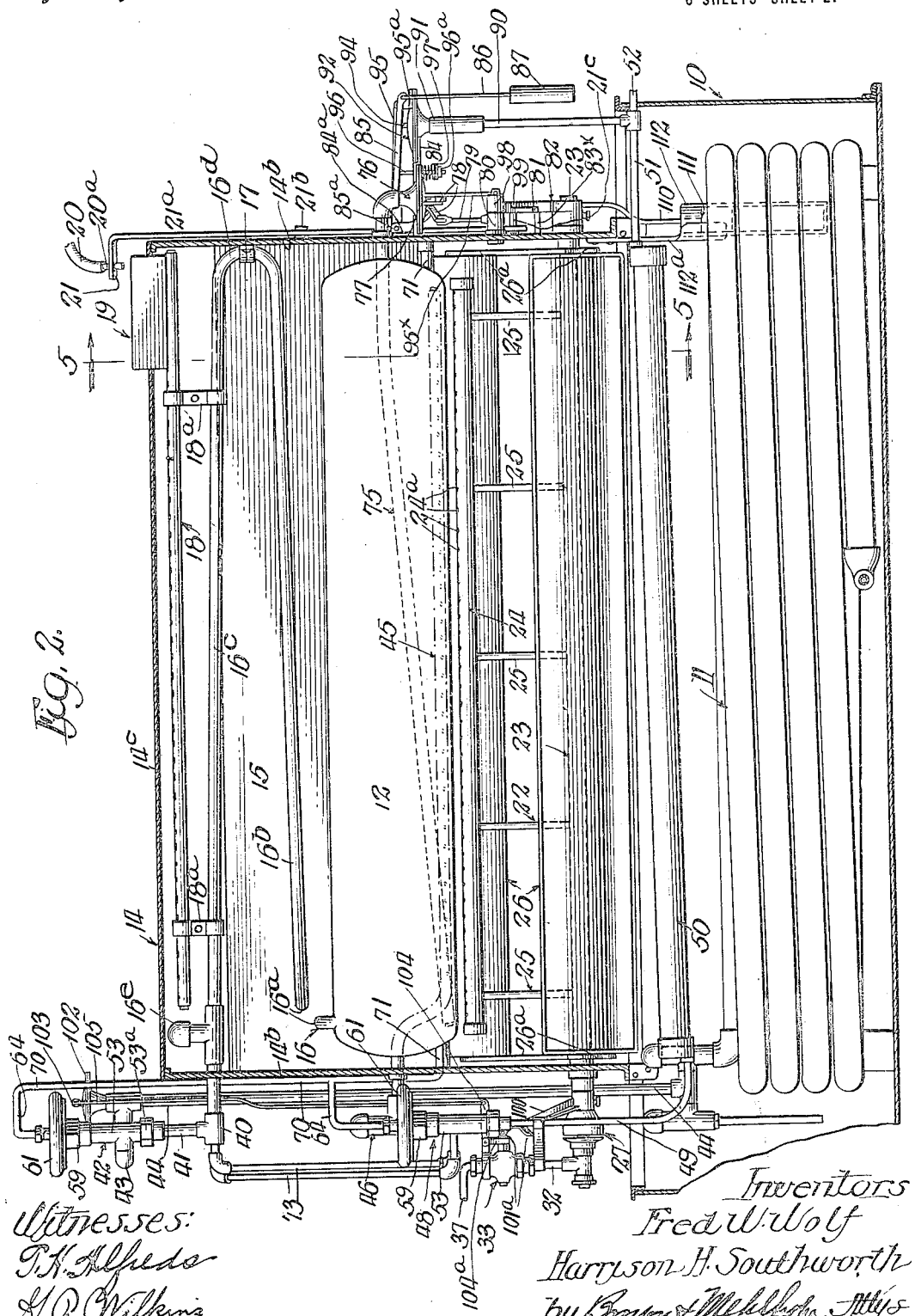

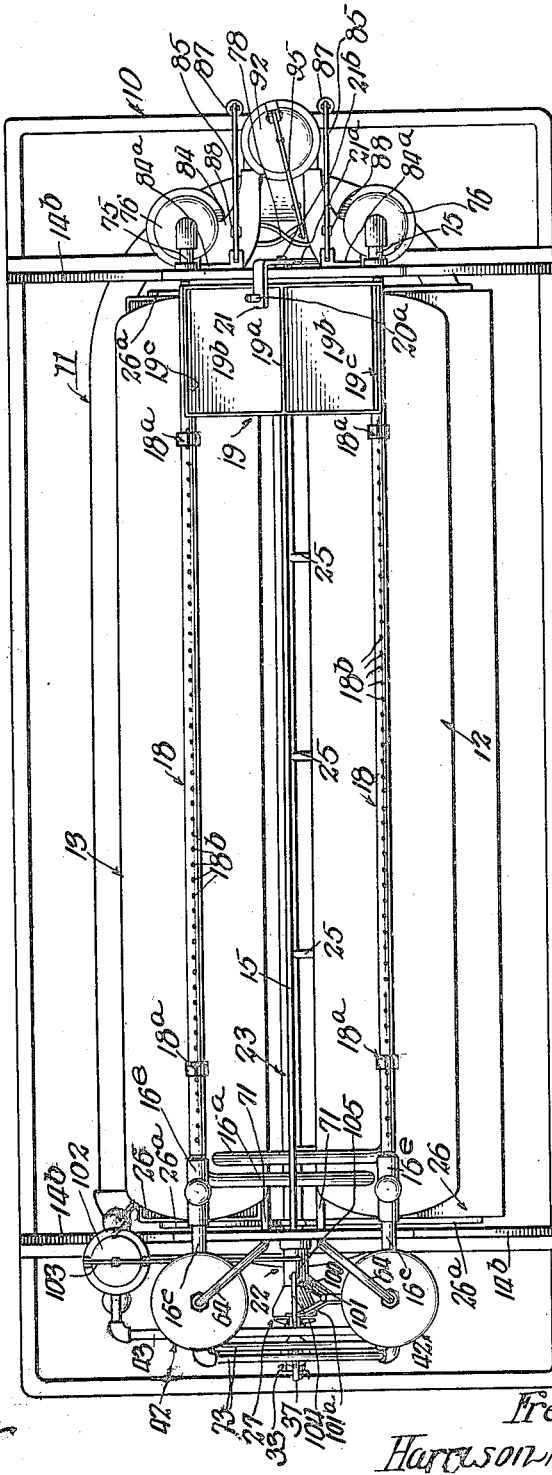

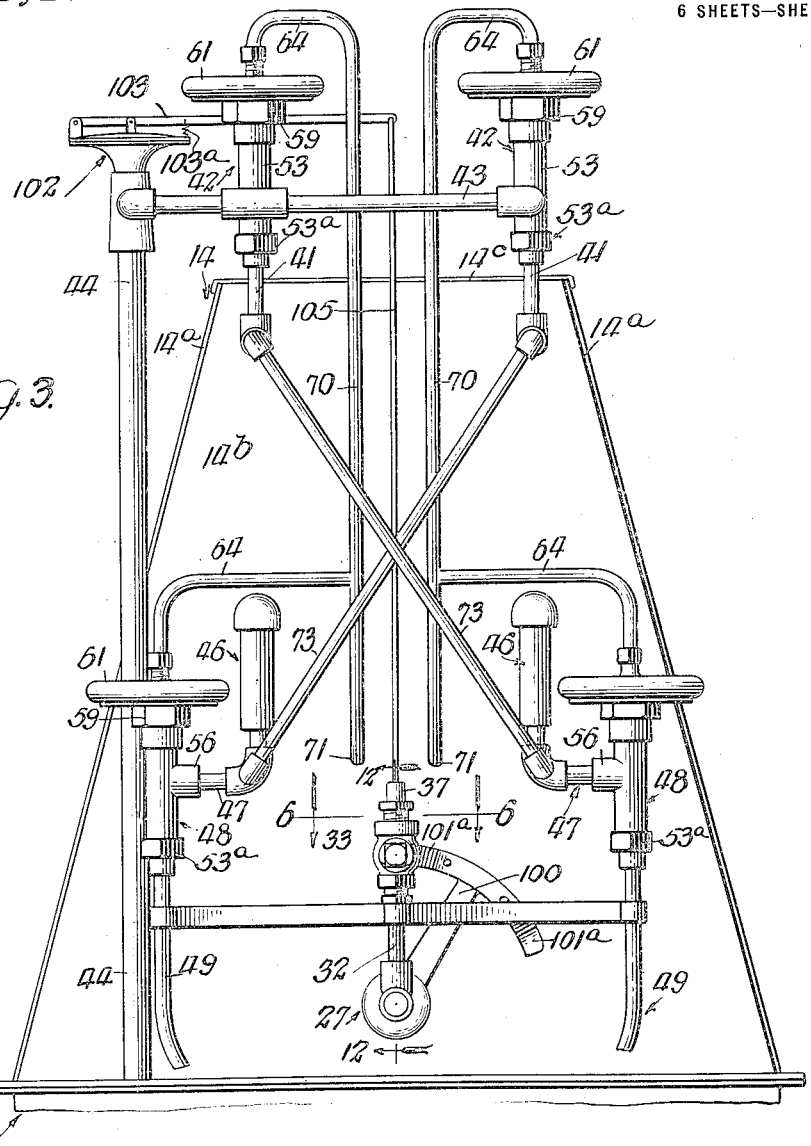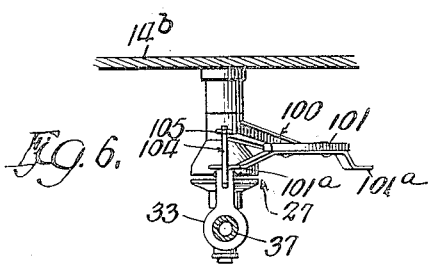

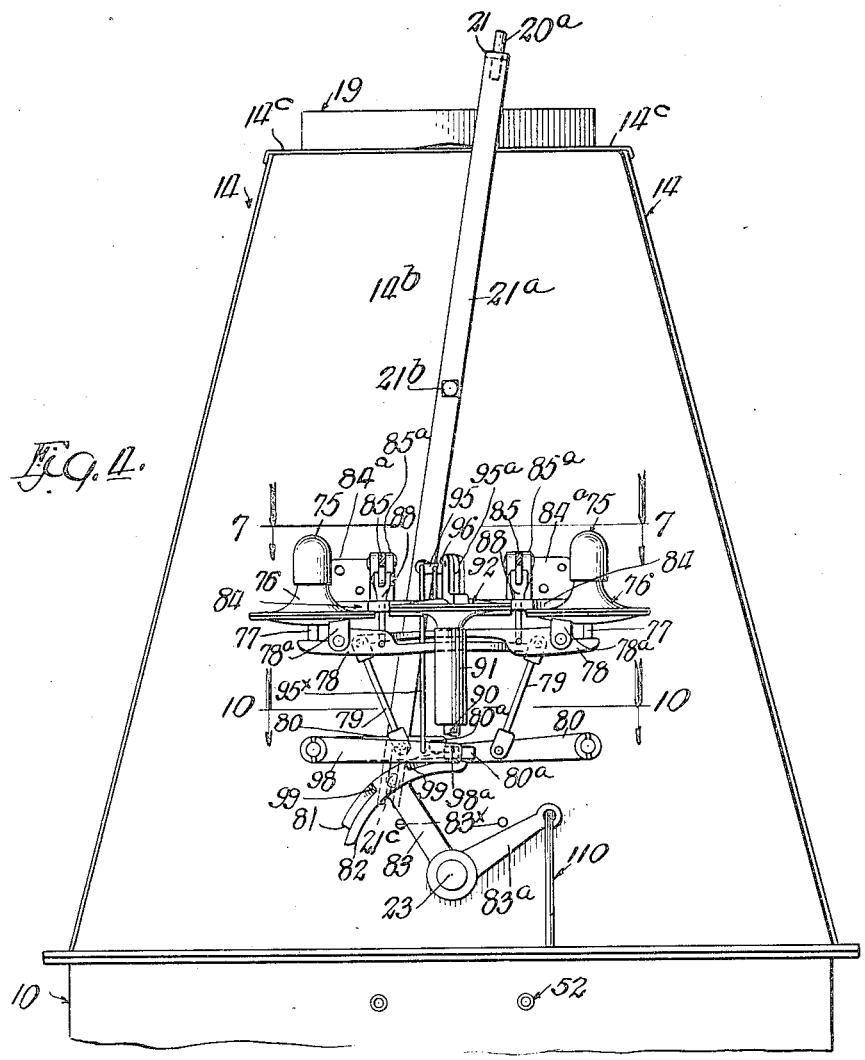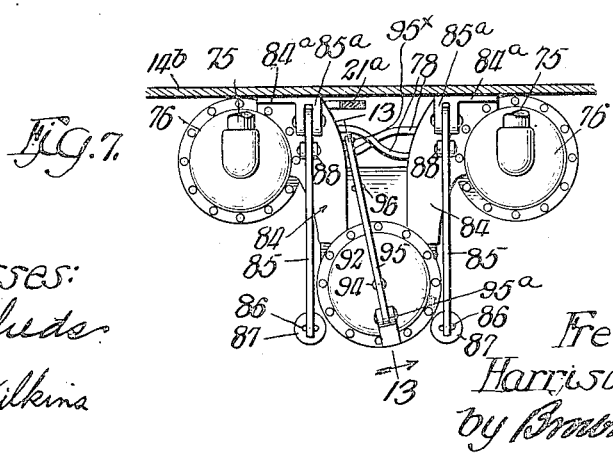

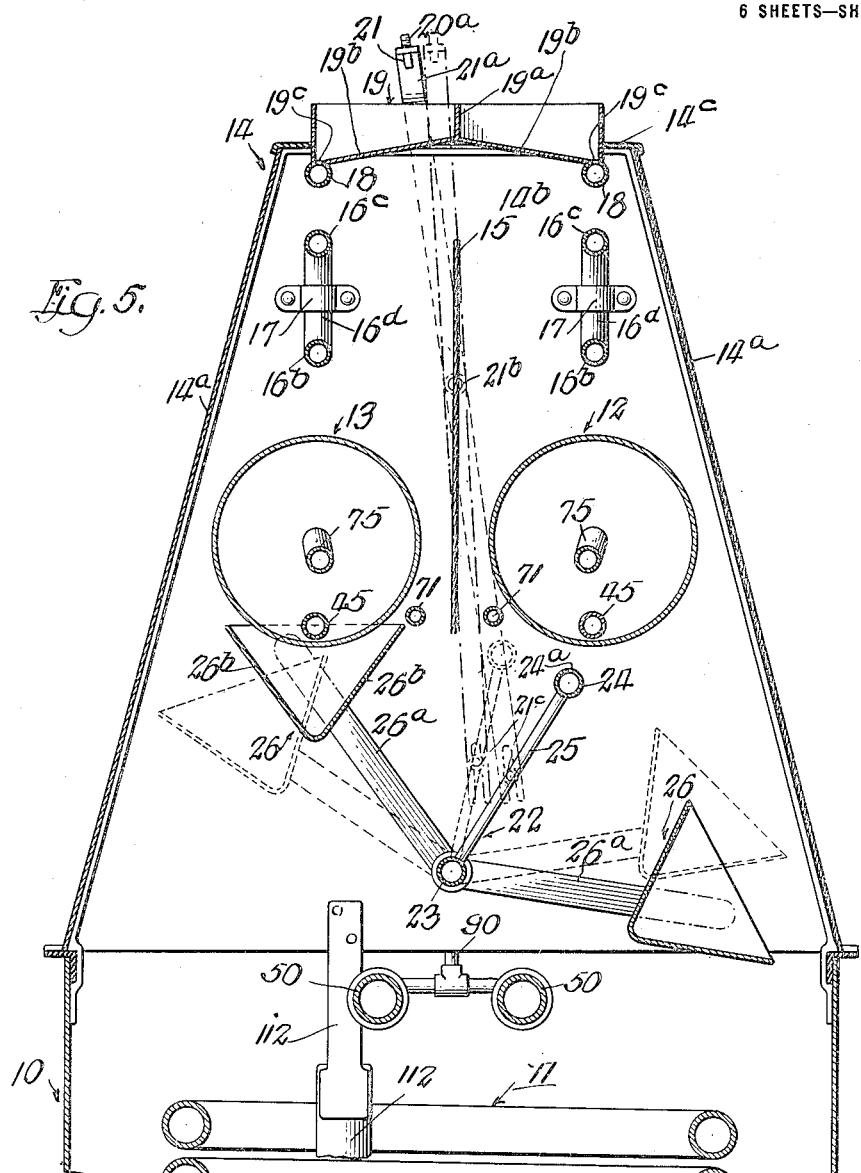
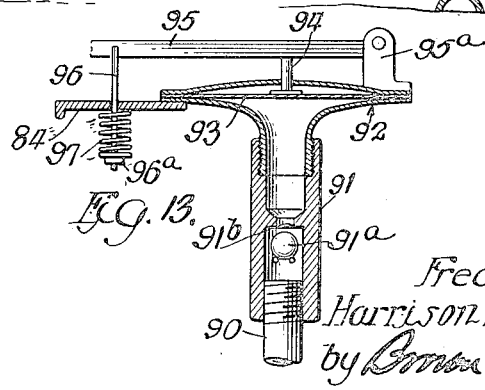

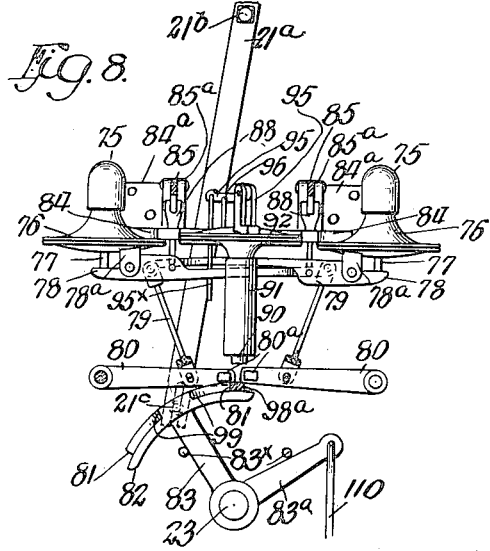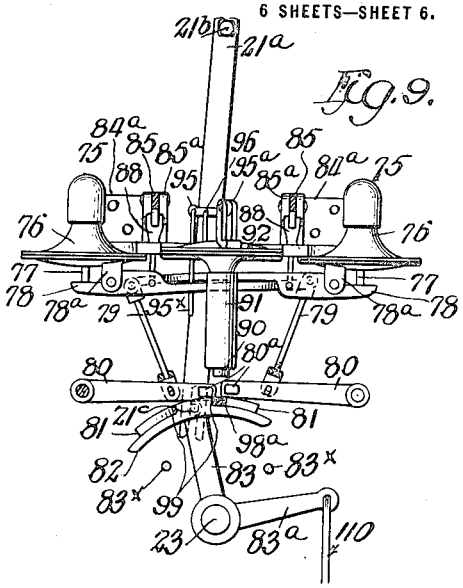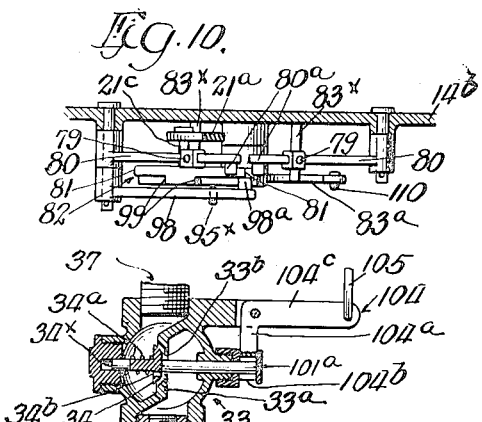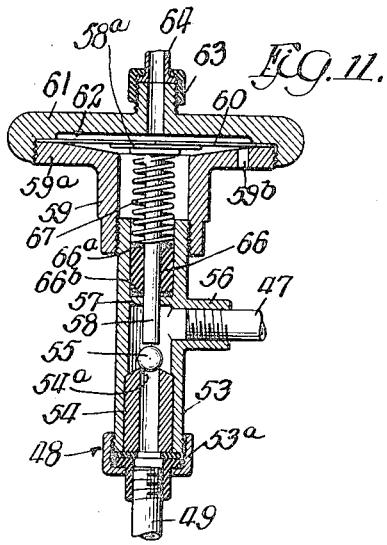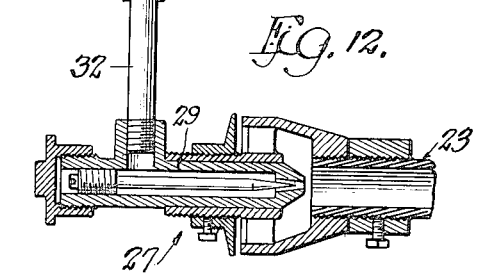

UNITED STATES PATENT OFFICE.

HARRISON H. SOUTHWORTH, OF CLEVELAND, OHIO, AND FRED W. WOLF, OF CHICAGO, ILLINOIS, ASSIGNORS, BY MESNE ASSIGNMENTS, TO THE ICELESS MACHINE COMPANY, OF CLEVELAND, OHIO, A CORPORATION OF OHIO.

REFRIGERATING APPARATUS.

1,139,460.  Specification of Letters Patent.  Patented May 11, 1915.

Application filed October 23, 1912. Serial No. 727,353.

*To all whom it may concern:*

Be it known that we, HARRISON H. SOUTHWORTH and FRED W. WOLF, citizens of the United States, and residents, respectively, of Cleveland, in the county of Cuyahoga and State of Ohio, and of Chicago, in the county of Cook and State of Illinois, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in refrigerating apparatus and consists of the matters hereinafter described and more particularly pointed out in the appended claims.

The improvements embraced in the present invention are shown herein as applied to the type of refrigerating apparatus described in applications heretofore filed by us on the 1st day of March, 1911, Serial No. 611,560 and on the 29th day of January, 1912, Serial No. 673,972.

In the drawings:—Figure 1 is a view representing a top plan of a refrigeration apparatus of the type described provided with our improvements. Fig. 2 is a view of the apparatus in side elevation with the side wall of the tank and of the inclosing casing above the tank broken away. Fig. 3 is a view on an enlarged scale representing a front elevation of the upper part of the apparatus. Fig. 4 is a view on a like scale representing a rear end elevation of the upper part of the apparatus. Fig. 5 is a view representing a partial transverse section in a plane indicated by the line 5—5 of Fig. 2, the scale being the same as that in Figs. 3 and 4. Fig. 6 is a view representing a partial transverse section of the part of the apparatus shown in Fig. 3, in a plane indicated by the line 6—6 of Fig. 3. Fig. 7 is a view representing a partial transverse section through the apparatus shown in Fig. 4, in a plane indicated by the line 7—7 of Fig. 4. Figs. 8 and 9 are views in rear end elevation of a part of the apparatus shown in Fig. 4, showing the mechanism in different relations to be more particularly referred to later. Fig. 10 is a view representing a partial transverse section through the part shown in Fig. 4, in a plane indicated by the line 10—10 of Fig. 4. Fig. 11 is a view representing a vertical central section through one of the diaphragm operated valves embraced in the apparatus. Fig. 12 is a view representing a partial vertical section through the apparatus shown in Fig. 3, in a plane indicated by the line 12—12 of Fig. 3, the said section being shown on an enlarged scale. Fig. 13 is a view representing a vertical section through the part shown in Fig. 7, in a plane indicated by the line 13—13 of Fig. 7.

Referring now to the drawings, 10 indicates a tank which forms the base of the apparatus and which is adapted for containing cooling water for cooling the liquid ammonia condensing and receiving coils 11 which are contained within it.

12, 13 indicate parallel, longitudinally extending, elongated metal drums, which constitute the generator absorbers adapted for containing aqua ammonia and which are cooled and heated in alternation in the operation of the apparatus. The said drums are inclosed by a metal casing 14 having inclined side walls 14$^a$, 14$^a$, and upright front and rear walls 14$^b$, 14$^b$ which rest upon and are secured to the upper edges of the walls of the tank 10. The drums are separated by a partition 15 which is spaced midway between them and extends the full length of the casing 14 with its ends secured to the end walls 14$^b$, 14$^b$ of said casing.

14$^c$ indicates the top wall of the casing.

To the top of each drum at its forward end is secured a pipe 16 for the discharge of the ammonia gas distilled from said drum. Said pipe 16 rises shortly above the level of the drum to which it is attached, crosses over by means of an upwardly inclined branch pipe 16$^a$ (which extends through the dividing wall 15) to a point in the vertical plane through the central axis of the adjacent drum and has an upwardly and rearwardly inclined branch 16$^b$. Said branch pipe 16$^b$ has connection at its rear end with a forwardly and upwardly inclined branch pipe 16$^c$, the two being connected at their rear ends by a bend 16$^d$ attached by a loop or strap 17 to the rear wall 14$^b$ of the upper casing 14. The branch pipes 16$^b$ and 16$^c$ constitute rectifiers in which the distilled ammonia is dehydrated, and are each located in the vertical plane extending through the longitudinal central axis of the drum or generator-absorber adjacent to the one with which they are connected.

Above each pair of branch-pipes 16$^b$ and 16$^c$ and in the vertical plane thereof, is located a water-pipe 18, the same, as shown in the drawings, being supported upon the upper branch pipe 16$^c$ by means of straps 18$^a$, 18$^a$. Upon the rear ends of the water pipes 18 and extending between them is a box 19 having a longitudinally extending partition 19$^a$ located in a plane half way between the plane of the water pipes 18 and dividing said box into two compartments. Each compartment has a bottom wall 19$^b$ that is inclined downwardly from said partition toward the associated water-pipe 18. Said bottom wall 19$^b$ has a slot 19$^c$ (see Fig. 5) which opens into the top of the associated water-pipe 18. Each pipe 18 in its length beyond the box 19 has a plurality of longitudinally spaced perforations 18$^b$ on its top side. Thus water discharged into one of the compartments of the box 19 upon the inclined bottom thereof will flow into and fill one of the pipes 18 throughout its length and from said pipe will flow through the perforations 18$^b$ and fall upon the branch pipes 16$^b$, 16$^c$, constituting the rectifiers, and then fall upon the associated tank 12 or 13 below it.

Water is discharged into the box 19 from a flexible pipe or tube 20 connected to any suitable source of water supply (not shown) having a nozzle 20$^a$ which is engaged by a fork 21 at the upper end of a lever 21$^a$. Said lever is pivotally mounted on a stud 21$^b$ on the rear end wall 14$^b$ of the upper casing, so as to be capable of an oscillating movement in a vertical plane to swing the nozzle 20$^a$ from a position above one compartment of the box 19 to a position above the other compartment. Said lever is oscillated by mechanism and in a way presently to be described.

Below the drums is located a burner 22 which is adapted to be swung from a position below one drum to a position below the other drum. Said burner comprises a longitudinally extending pipe 23, closed at its rear end, and rotatively mounted in the end walls 14$^b$ of the casing 14 and constituting a rock-shaft on which the burner is adapted to be rocked; and a longitudinally extending pipe 24 vertically spaced from and parallel to the first named pipe 23 and connected to said pipe by means of longitudinally spaced pipes 25. The pipe 24 is of substantially the length of the drums 12, 13, is closed at both ends, and is provided with burner openings 24$^a$ so placed in the pipe that when the pipe 24 is under one of the drums, the flame will be directed against said drum.

At each side of the burner pipe, in the arc of a circle about the rock-shaft pipe 23 and at suitable angular distances from the pipe 24, are located troughs 26, 26, which are rigidly connected by means of arms 26$^a$, 26$^a$ to the pipe 23 so as to rock therewith. The said troughs are triangular in cross-section, are open at the top, and have inclosing end walls 26$^b$, 26$^b$ to each of which is rigidly connected one of the arms 26$^a$. These troughs are so proportioned and positioned with reference to the burner pipe 24 that they may be swung into a position under the drums and into a position removed from the drum without striking said drums in their movement, as shown in Fig. 5, and so that their side walls will partially embrace the curved walls of the drums when they are in position under the drums.

Fuel gas is admitted to the rock-shaft pipe 23 of the burner through an adjustable mixing valve 27 of familiar type, adapted for supplying the proper mixture of air and gas. (Said valve is shown in section in Fig. 12.) A pipe 32 connects the casing 29 of the mixing valve with a second valve casing 33, which, as shown, is spherical and has formed within it a partition wall 33$^a$ separating the casing into two compartments. Said partition is provided with a valve opening having a seat 33$^b$ against which is adapted to seat a valve disk 34. Said valve disk has a stem 34$^x$ that extends diametrically of the valve casing at right angles to the partition wall 33$^a$ and has reciprocable bearing in said casing. One end of said valve stem projects outside of the casing. The pipe 32 leading to the mixing valve casing 29 opens into one compartment of the casing 33, while a main fuel gas supply pipe 37 opens into the other compartment. The valve disk 34 is normally held closed on its seat by a coiled spring 34$^a$ which bears between the rear face of said valve disk and the inner wall of the casing. The valve disk 34 is provided with an aperture 34$^b$ of small diameter which provides for a continuous passage of a small amount of fuel gas to provide a pilot flame when the valve disk is closed.

Each of the upper branches 16$^c$ of the rectifier pipe are provided with check-valves 16$^e$ adapted to prevent the return flow of ammonia gas therethrough and are then extended beyond the front wall 14$^b$ of the upper casing 14, where they are connected by T-fittings 40 with upright pipes 41 that communicate with positively operating automatic check-valve structures 42 that will be more particularly described later. Each of said check-valve structures 42 is connected by suitable fittings to a common pipe 43 leading to an upright-pipe 44 which is connected with the condensing and receiving coil 11.

In the bottom of each drum 12 and 13 is located a perforated pipe 45 that may be termed a suction pipe, which is closed at its inner end and which projects through the front end of the drum and through the front wall 14$^b$ of the upper casing. Beyond said wall it is provided with a check-valve 46 that is adapted to prevent a return flow from the drum through said check-valve. Beyond the check-valve 46 is a connection 47 which leads into a positively acting automatic check-valve structure 48 which is also adapted to prevent a return flow from the drum. This latter valve structure is connected by a pipe 49 with a trap 50 adapted to arrest any liquor which may leak through the check-valve when the associated generator-absorber is being heated, the same being preferably of the construction described in the application heretofore referred to, Serial Number 673,972. Said trap is connected by a branch pipe 51 with a main return pipe 52 which leads from the refrigerating coils and is adapted for the return of the expanded ammonia gas to that one of the two generator-absorbers which is absorbing.

Each of the four positively operating automatic check-valves 48, 48, and 42, 42 are alike, so that a description of one will suffice for all. We shall therefore describe one of the valves 48 which is interposed between one of the return branch pipes 49 of the return system, and the pipe 47 connected by the check-valve 46 with the suction pipe 45.

Said valve (see Fig. 11) has a tubular casing 53 which is connected at its lower end by a suitable coupling 53$^a$ to the pipe 49. In the lower end of said casing is secured a tubular valve plug 54 provided at its upper end with a knife-edge valve seat 54$^a$ for a ball 55. Above the level of said valve seat 54$^a$ the pipe 47 opens into and is connected to the casing 53 by means of a nipple 56. Thus normally fluid may flow from the pipe 49 to the pipe 47 by lifting the ball 55, while the return of fluid in the opposite direction from the pipe 47 to the pipe 49 is prevented by the weight of the ball which normally gravitates to its seat.

Mechanism is provided for positively holding the ball 55 on its seat as follows: Above the pipe 47 the casing 53 is provided with a partition wall 57 having an aperture through which projects a vertical stem 58 that is adapted to engage the ball 55, but which is normally held from such engagement. To the upper end of the casing 53 is secured a sleeve 59 having a recessed, annular flange 59$^a$. 60 indicates a diaphragm preferably made of thin metal, bearing upon a plate or flange 58$^a$ fixed to the upper end of the stem 58. Said diaphragm is held in place against the flange 59$^a$ of the sleeve 59 by an annular cap 61 having an internally threaded flange which is screwed upon the threaded annular edge of the flange 59$^a$. Said cap 61 is provided with a recess 62 to form a chamber above the diaphragm 60 and has a threaded apertured nipple 63 by which it is connected to a pipe 64. The flange 59$^a$ is provided with an aperture 59$^b$ which opens into the space below the diaphragm 60 so as to provide atmospheric pressure on the underside of said diaphragm.

66 indicates a packing sleeve, preferably of soft rubber, which surrounds the stem 58 and is interposed between said stem and the walls of the casing 53 above the partition wall 57 therein. Above and below said packing sleeve are located metal washers 66$^a$, 66$^b$. A spring 67 coiled about the stem 58 is interposed between the top washer 66$^a$ and the flange 58$^a$ at the top of the stem. Said spring normally holds the stem 58 from contact with the ball 55 and maintains the packing sleeve 66 in compression so as to prevent leakage about the stem. The packing sleeve 66 is made of soft elastic material, such as pure gum rubber, and as the movement of the valve stem 58 up and down is very slight, the elasticity of the material of the packing sleeve permits that part of it adjacent to the stem to move with the stem and thus prevents a movement of the stem through or relative to the packing. The possibility of leakage is thus obviated.

The pipe 64 of the positively acting check-valve 48 in the ammonia gas return conduit of each drum is connected to a pipe 70 (see Fig. 3) which is connected at its upper end to the pipe 64 entering the diaphragm of the positively acting check-valve 42 in the ammonia gas discharge conduit of the other drum. The pipes 70 have connection at their lower ends with horizontal pipes 71, 71 spaced at each side of the partition 15 between the drums 12 and 13 and located slightly above the level of the arcuate plane in which the burner tube 24 of the burner rotates. The rear ends of the pipes 71 are closed, and the pipes 71, 70 and 64 are filled with a thermostatic fluid adapted, under a predetermined temperature, to expand the fluid and exert sufficient pressure on the diaphragms 60 to overcome the upward action of the springs 67 in the valve casings 53 and bring the stems 58 down against the balls 55 and hold the same closely adjacent their seats.

The tubular valve plugs 54 are preferably made of case-hardened steel and the valve seats on said plugs are made sharp as described so that when scale or other solid matter is caught between the ball and its seat, the pressure exerted by the stem 58 when it bears on the ball, will cut such scale or solid matter, which will then fall or drop below the valve seat. The valve is thus self cleaning.

73, 73 indicate by-pass pipes connecting the part of the discharge conduit intermediate each pair of check-valves 16ᵉ and 42 with a point in the return-conduit of the associated generator-absorber intermediate the check-valves 46 and 48 so that any ammonia gas which, by reason of head pressure from the liquid ammonia receiver coils or from any other source, leaks back through the check-valves 42 and passes in a contrary direction therethrough, will take the path of least resistance down through the pipe 73 into the pipe 47, and thence through the check-valve 46 will pass into the connected suction pipe, whence it will escape below the surface of the aqua ammonia therein by which it will be absorbed.

As shown herein, the burner 22 and the water discharge nozzle 20ᵃ, comprising the heating and cooling means, are shifted to simultaneously heat and cool the two drums in alternation by means as follows: In each drum is located a pipe 75 containing a thermostatic fluid (see Figs. 2 and 5) which pipe is closed at its front end and projects through the rear end of the drum and beyond the rear end wall of the upper casing where it is connected to a casing 76 containing a diaphragm adapted, under pressure developed in the pipe 75 and the casing 76, to depress a stem 77. 78 indicates horizontal levers fulcrumed on lugs 78ᵃ fixed to the casings 76 and each having a short arm adapted for engagement by the stem 77 mounted in the associated casing. The longer arms of said levers are each connected by links 79 to levers 80 located below the levers 78 and fulcrumed on the rear end walls 14ᵇ of the casing 14. The levers 80 project toward each other beyond their connection with the respective links 79 and are provided at their ends with laterally projecting lugs 80ᵃ which are adapted for engagement against radial shoulders 81, 81, on an arcuate plate 82 carried by a rock-arm 83 fixed to the rear end of the rock-shaft pipe 23 of the burner 22. The construction is such that the lugs 80ᵃ on the levers 80, unless otherwise restrained, will normally hang in the arcuate path of the said shoulders 81 on the arcuate plate 82.

The diaphragm casings 76 are supported on a horizontal plate 84 having flanges 84ᵃ, 84ᵃ, bolted to the upright rear wall 14ᵇ of the casing 14. Levers 85, 85 are fulcrumed on lugs 85ᵃ, 85ᵃ, fixed to said plates 84 and, projecting rearwardly in a horizontal direction from the rear wall 14ᵇ of the upper casing, carry weights 87 at their outer ends suspended by suitable links 86. Each of said levers 85 is connected by a link 88 with one of the levers 78. It is thus necessary that sufficient pressure be developed in the diaphragm casings 76 to depress the stems 77 with such force as to lift, not only the weight of the operating parts, but also the weights suspended at the ends of the levers 85, before the levers 78 will be operated to raise their associated levers 80 from the arcuate path of the shoulders 81 on the arcuate plate 82. The weights are carefully determined so as to prevent this operation of the parts until the temperature in the generator-absorber which is being heated, has risen to a predetermined point corresponding with the weakness of liquor with which the apparatus is designed to work.

Connected to the return-pipe 52 leading back to the generator-absorber from the refrigerator coil, is an upright pipe 90 which communicates with a casing 91 at the upper end of which is provided a diaphragm casing 92. The diaphragm casing contains a diaphragm 93 adapted to operate a stem 94 which engages against a horizontal lever 95 that is pivoted to a lug 95ᵃ rising from the diaphragm casing. The diaphragm casing 92 is rigidly connected to and supported at the end of the plates 84 intermediate the other two diaphragm casings 76 and spaced outwardly therefrom.

96 indicates a link connected to the lever 95 beyond the diaphragm casing 92 and depending through an aperture in the plate 84. Said link 96 is provided at its end with a fixed part or nut 96ᵃ located below said plate 84. A coiled spring 97 is interposed between said nut and the under face of the plate 84. The tension of this spring is carefully predetermined to correspond to the pressure to be attained in the generator-absorber that is absorbing, indicating the predetermined degree of saturation at which the apparatus is designed to work. Thus the pressure acting against the diaphragm 93 will have no effect to raise the lever 95 until this predetermined pressure in the generator-absorber that is absorbing has been reached.

Fulcrumed in a vertical plane adjacent to one of the levers 80, is a lever 98 which is preferably pivoted on the same stud as the said lever 80 and which carries at its end a lug 98ᵃ normally adapted to stand in the arcuate path of shoulders 99, 99, formed on the arcuate plate 82, in a plane adjacent to the other shoulders 81, 81 thereof. Said shoulders 99 are spaced each side of the median radius of said arcuate plate and are each located intermediate one of the shoulders 81 and said median radius. The lever 95 that is operated by the diaphragm 93 is extended into the vertical plane of the lever 98 and carries at its end a hooked link 95ˣ which engages in an aperture in said lever 98 near its end, so that the upward movement of the lever 95 under the action of the diaphragm acts to lift the lever 98 and thus raise the lug 98ᵃ carried at its end out of the path of the stops or shoulders 99, 99.

The movement of the burner 22 is limited in either direction by stops or pins 83ˣ (see Fig. 4) fixed to the rear end wall of the upper casing in a position to be struck by the arm 83 on the burner when the burner comes to heating position under either of the drums. To prevent jarring when the burner 22 is stopped in said position, it is provided with an arm 83ᵃ (secured to it as shown, adjacent to the arm 83) which arm is connected by a link 110 with the piston 111 of a dash-pot 112. (See Figs. 2 and 4.)

The water discharge nozzle 21 is shifted with the burner 22, but in the opposite direction. As shown, the lever 21ᵃ which shifts it has a fork at its lower end which engages a pin 21ᶜ on the burner arm 83 so that the shifting movement of the burner will cause a shifting movement of the nozzle 20ᵃ.

At the forward end of the rock-shaft pipe 23 of the burner 22 (see Figs. 3, 6 and 12) there is secured a rock-arm 100 carrying an arcuate plate 101 located in a plane adjacent to the end of the valve stem 34ˣ which operates the valve disk 34 in the fuel gas supply valve casing 33. Said plate 101 carries at its ends spring-shoes 101ᵃ, 101ᵃ (which, as shown, are made in one piece) and which are adapted when swung into a position in line with said valve stem 34ˣ to strike the same and move it longitudinally inward against the action of the coiled spring 34ᵃ and thus move the valve disk 34 from its seat. The said spring-shoes and the arm 100 carrying them, are so arranged with reference to the burner 22, that one or the other of them will be in operative engagement with said stem 34ˣ so as to hold the valve open, when the burner is in heating position under one or the other drums 12, 13.

As in the case of the second above referred to application, a thermostatic device is provided in the common ammonia discharge pipe 44 which leads to the receiving coil, to turn down the gas in case the temperature of the ammonia gas delivered from the rectifier pipe is higher than a certain degree indicating that generation is taking place too rapidly for the ammonia gas to become thoroughly dehydrated in its passage through the rectifier pipe. 102 indicates this thermostatic device. (See Fig. 3.) The same comprises a diaphragm casing containing a diaphragm as before. 103 indicates a lever adapted to be operated by said diaphragm and to be raised when the certain temperature above referred to has been reached by the ammonia gas passing through the pipe 44. The raising of the lever prior to this time is prevented by a coiled spring 103ᵃ the tension of which is carefully predetermined. This thermostatic arrangement thus far referred to requires no further description to and forms no part of the present invention.

On the valve casing 33 is pivotally mounted a bell-crank lever 104 which is adapted to swing in the vertical plane containing the valve stem 34ˣ and which has a vertical arm 104ᵃ, provided with a fork 104ᵇ, which straddles the projecting end of the valve stem and is located between the casing and the path of the spring-shoes 101ᵃ, 101ᵃ. The horizontal arm 104ᶜ of said bell-crank lever is connected by a long link 105 with the lever 103 that is operated by the thermostatic device 102.

When the arm 100 is in position so that one of the spring-shoes 101ᵃ holds the valve-stem 34ˣ with the valve disk 34 away from its seat, which is its position when the burner is in heating position under one of the drums, the fork 104ᵇ lies close against the valve casing, and permits the full intended opening of the valve. Should, however, the temperature of the ammonia gas passing through the common discharge pipe 44 rise above the certain point referred to, the thermostatic device will cause the lever 103 to rise and this will produce an upward movement of the horizontal arm of the bell-crank lever 104. This will cause the vertical arm of said lever to move outwardly away from the valve casing 33 and push the spring-shoe 101ᵃ away from the valve stem 34ˣ, whereupon the valve disk 34, under the pressure of the coiled spring 34ᵃ, will move toward its seat and close or partially close thereon. This will cut down the gas supply to the burner and the closed or partially closed position of the valve will be maintained until the temperature of the ammonia gas passing through the pipe 44 has fallen below the aforesaid certain temperature, whereupon the lever 103 will descend thus moving the fork 104ᵇ back into its normal position and the full valve will be returned by the action of the spring-shoe to its open position.

The operation of our improved refrigerating apparatus is as follows: Starting with the parts in the position shown in all of the views of the drawings excepting Figs. 8 and 9, the burner 22 is in heating position under the generator-absorber 12; the cooling water nozzle 20ᵃ is in a position to direct the cooling water upon the inclined bottom 19ᵇ of the compartment of the box 19 which is located above the generator-absorber 13; the water-trough 26 to the left of the burner 22 is under the generator-absorber 13, while the other trough 26 is in a position to the right of the generator-absorber 12 and so turned that all water has been discharged from it; the disk valve 34 of the main fuel supply valve is raised fully from its seat so that a full supply of fuel is being furnished to the burner 22; the dog or lug 80ᵃ of the lever 80, at the right as shown in Fig. 4, is engaged against the right-hand shoulder 81 of the arcuate plate 82 carried by the rock-shaft pipe 23 of the burner; the lug or dog 98ᵃ on the lever 98, which is adapted to be operated by the back pressure from the generator-absorber, stands in the path of the right-hand stop or shoulder 99 (as shown in Fig. 4) of the arcuate plate 82, and all of the diaphragms are in normal position so that they have no effect to raise any of the levers which they are intended to operate. The parts remain in this position until the generator-absorber 12 is heated to a temperature (carefully predetermined) corresponding to and indicating the presence in said generator-absorber of the weakness of liquor contained therein at which the apparatus is intended to work. When this temperature is reached, the water or other fluid in the pipe 75 in said generator-absorber, will, by its boiling and expansion, induce sufficient pressure in the associated diaphragm chamber 76, to raise the long arm of the lever 78, notwithstanding the associated weight 87, and with it the connected lever 80 and thus lift the dog or lug 80ᵃ engaged against the right-hand shoulder 81 on the arcuate plate 82 so as to release said arcuate plate (see Fig. 8) and permit it and the burner to rotate toward the right, as shown in Fig. 4, and to the left as shown in Fig. 5. During this time the cooling water falling on the rectifier pipe above the generator-absorber 13, and from thence dripping upon the generator-absorber 13, has been flowing about the sides of said generator-absorber and filling the trough 26 below it, so that when the plate 82 is released as above described, the weight of the water in said trough 26 causes the burner to shift toward the other generator-absorber 13. In the meantime the liquor in the said generator-absorber 13 that is absorbing has been approaching the degree of saturation that the apparatus is designed to work with and the pressure thereon has been gradually rising; but unless it has risen sufficiently to raise the lever 95 connected with the back-pressure diaphragm 93 at the time that the burner is shifted, the lever 98 carrying the dog or lug 98ᵃ will normally stand in such position that when the burner is shifted as above described, the right-hand shoulder 99, as seen in Fig. 4, will strike said lug 98ᵃ and arrest the movement of the plate 82 and also the burner so that the burner will stand in the position indicated in dotted lines in Fig. 5, and the arcuate plate will stand in the position shown in Fig. 9.

As the burner moves into this position it will swing the lever 21ᵃ which is adapted to shift the cooling water nozzle 20ᵃ into the position shown in dotted lines in Fig. 5, in which it will still continue to direct cooling water upon the generator-absorber 13.

The burner and the cooling-water nozzle will remain in this position until the back-pressure in the generator-absorber 13 rises to a predetermined pressure at which it will overcome the tension of the spring 97 connected with the lever 95 and lifting said lever will thereby cause the lever 98 to lift, so that the lug 98ᵃ carried thereby is moved out of the path of the shoulder 99 on the arcuate plate 82, and the weight of the water still retained in the trough 26 under the generator-absorber 13, will cause the burner to shift from its intermediate position to heating position below the generator-absorber 13. In this shifting of the burner, the trough 26 will be brought to such a position as to discharge the water that remains in it so that it will no longer affect the operation of the burner by its weight.

Upon the arcuate plate 83 reaching the right-hand limit of its movement (as appears in Fig. 4) the lug 80ᵃ on the left-hand lever 80 associated with the generator-absorber 13, will drop into position to engage against the left-hand shoulder 81 of said arcuate plate so as to resist a return movement of said plate and therefore of the burner and the lug 98ᵃ of the lever 98 will fall into a position in the path of the left-hand shoulder 99 of said arcuate plate, so as to again arrest the shifting of the burner in case the predetermined temperature in the generator-absorber which is being heated is reached, before the predetermined pressure in the generator-absorber which is absorbing is reached. The second cycle then proceeds as the first, the generator-absorber 13 being now heated and the generator-absorber 12 being simultaneously cooled until the contents of the first have been heated to the predetermined temperature, whereupon the burner is shifted into its intermediate position at which it is held until the predetermined back pressure has been reached in the generator-absorber 12. The burner is then shifted to heating position under said generator-absorber 12 and the cooling water is directed to fall upon the generator-absorber 13, the position first described.

During the time that either generator-absorber is being heated and the burner 22 is in heating position below the same and also when said burner is in its intermediate position adjacent said generator-absorber and burning at pilot flame (when it is immediately below the thermostatic pipe 71 adjacent said generator-absorber, as appears in Fig. 5) the said thermostatic pipe 71 is being heated and the associated diaphragm 60, that control the positively acting check-valves 48 and 42 interposed respectively in the discharge conduit of the adjacent generator which is absorbing and in its own return conduit, are expanded so as to hold the balls of said check-valves rigidly closed on their seats. This positively prevents the flow of ammonia gas in the wrong direction, that is to say, prevents the flow of the generated ammonia gas into the drum which is absorbing and prevents the escape of fluid from the drum which is generating into the return system. The fact that said check-valves are closed in this way and also their construction as heretofore described is important since while a piece of scale or other extraneous matter might fall on the seat and prevent the proper closing of the other check-valves, the pressure on the balls of the positively acting check-valves, together with their knife-edge case-hardened seats, breaks the scale or cuts it so that it is dislodged from the seat and the ball is permitted to properly close.

We prefer to provide a ball valve 91$^a$ (see Fig. 13) and a seat 91$^b$ above it in the casing 187 leading to the back pressure diaphragm casing 91, so that if the diaphragm 93 is ruptured by reason of undue back pressure or for any other reason, said ball-valve by the rush of escaping ammonia gas will be closed upon its seat and the further escape of ammonia be thus prevented. Means is provided as shown to normally support the ball 91$^a$ in a position closely adjacent to its seat.

We claim as our invention:—

1. In a refrigerating apparatus, the combination with a generator-absorber, of a discharge conduit therefor and a return conduit, means for cooling and heating said generator-absorber in alternation, a valve located in the discharge conduit, and thermostatic means for positively closing the valve in the discharge conduit during the period of absorption.

2. In a refrigerating apparatus, the combination with a generator-absorber, of a discharge conduit therefor and a return conduit, means for cooling and heating said generator-absorber in alternation, a valve located in the return conduit, and thermostatic means for positively closing the valve in the return conduit during the period of generation.

3. In a refrigerating apparatus of the absorption type, including generator-absorbers arranged in pairs, means providing discharge conduits for leading the generated fluid from each of said generator-absorbers, means providing return conduits for leading the expanded refrigerant back to each of the generator-absorbers, means for cooling and heating said generator-absorbers in alternation, valves in each of said conduits, and means operated by the heat means and connected with each of said valves to positively hold closed the valve in the return conduit of the generator-absorber which is being heated, and the valve in the discharge conduit of the generator-absorber which is being cooled until the heating means is applied to the generator-absorber that is being cooled.

4. In a refrigerating apparatus of the absorption type, including generator-absorbers arranged in pairs, means providing discharge conduits for leading the generated fluid from each of said generator-absorbers, means providing return conduits for leading the expanded fluid back to each of the generator-absorbers, means for cooling and heating said generator-absorbers in alternation including a burner member adapted to supply heat to either of said generator-absorbers, said burner member being movable from heating position under one generator-absorber to heating position under the other generator-absorber, check-valves provided in each of said conduits adapted to prevent a back flow of fluid therethrough, movable stop members for each of said check-valves adapted to hold them against opening movement, and thermostatic actuating means associated with said stop members adapted to bring the stop member of the check-valve in the return conduit of the generator-absorber which is being heated and the stop member of the check-valve in the discharge conduit of the generator-absorber which is being cooled into operative position and to retain it there until the burner is shifted to heating position below the generator-absorber that is being cooled.

5. In a refrigerating apparatus of the absorption type, the combination of a pair of generator-absorbers, discharge and return conduits for each generator-absorber, means for cooling and heating said generator-absorbers in alternation including a burner member adapted to supply heat to either of said generator-absorbers, means for moving the burner member from heating position adjacent one absorber to heating position adjacent the other, means for stopping the burner in its movement from one generator-absorber to the other, a valve for controlling the supply of fuel to said burner, means acting on said valve and operated by a movement of the burner to diminish the supply of fuel when the burner is in an intermediate position, valves in each of said conduits, means for positively closing said valves, and thermostatic means operating the closing means and having members adapted to be heated by the burner whereby the closing of the valves is dependent upon the position of the burner.

6. In a refrigerating apparatus of the class described, including generator-absorbers arranged in pairs, means providing conduits for leading the generated fluid from each of said generator-absorbers, and means providing return conduits for leading the expanded fluid back to each of the generator-absorbers, check-valve devices located in each of said discharge conduits and return conduits adapted to prevent a back-flow of fluid through said conduits, and means for positively locking each check-valve in closed position against the back flow of fluid during the time that a forward flow of fluid is taking place in the like conduit of the other generator-absorber.

7. In an automatic refrigerating apparatus of the type described including generator-absorbers arranged in pairs, means providing conduits for leading the generated fluid from each of said generator-absorbers, said means in each case including a rectifier pipe rising from one generator-absorber, crossing over to a point in a vertical plane above the other generator-absorber and extending in an upwardly inclined direction in said vertical plane, and means for cooling said generator-absorbers in alternation, said means being adapted to direct the cooling medium upon the upwardly inclined part of said rectifier pipe in its passage to the generator-absorber to be cooled.

8. In an automatic refrigerating apparatus of the absorption type, including generator-absorbers arranged in pairs, means providing discharge conduits for leading the generated fluid from each of said generator-absorbers, means providing return conduits for leading the expanded fluid back to each of the generator-absorbers, means for cooling and heating said generator-absorbers in alternation, valves in each of said conduits and means dependent for its operation on the heating means, and connected with each of said valves, adapted to close the valve in the return conduit of the generator-absorber which is being heated and to close the valve in the generator-absorber which is being cooled, until the heating means is shifted to the generator-absorber that was being cooled.

9. In an automatic refrigerating apparatus of the absorption type, including generator-absorbers arranged in pairs, means providing discharge conduits for leading the generated fluid from each of said generator-absorbers, means providing return conduits for leading the expanded fluid back to each of the generator-absorbers, means for cooling and heating said generator-absorbers in alternation including a burner member adapted to supply heat to either of said generator-absorbers, said burner-member being movable from heating position under one generator-absorber to heating position under the other generator-absorber, check-devices provided in each of said conduits adapted to prevent a back flow of fluid therethrough, positively acting closing devices for each of said check-devices holding them against opening movement, and means operated by the heating means for intermittently actuating the check devices.

10. In an automatic refrigerating apparatus of the absorption type, including generator-absorbers arranged in pairs, means providing discharge conduits for leading the generated fluid from each of said generator-absorbers, and means providing return conduits for leading the expanded fluid back to each of the generator-absorbers, means for cooling and heating said generator-absorbers in alternation including a burner member adapted to supply heat to either of said generator absorbers, means for moving said burner member from heating position under one generator-absorber to heating position under the other generator-absorber, means for staying the movement of said burner member at an intermediate position in its path from one generator-absorber to the other, a valve for controlling the supply of fuel to said burner, means acting on the valve for diminishing the supply of fuel when said burner is in an intermediate position, check-valves provided in each of said conduits adapted to prevent a back flow of fluid therethrough, positively acting closing devices for each check-valve for holding them against opening movement, and thermostatic means including a member located adjacent each generator-absorber adjacent the point in the path of the burner where said burner is adapted to be stayed for operating each closing device to hold rigidly against its seat the check-valve in the return conduit of the generator-absorber which is being heated, and the check-valve of the generator-absorber which is being cooled until the burner is shifted to heating position under the other generator-absorber that has been cooled.

11. In an automatic refrigerating apparatus of the class described, including generator-absorbers arranged in pairs, means providing conduits for leading the generated fluid from each of said generator-absorbers, and means providing return conduits for leading the expanded fluid back to each of the generator-absorbers, check-valve devices located in each of said discharge conduits and return conduits to prevent a back flow of fluid through said conduits, and means for positively locking each check-valve in closed position against the back flow of fluid during the time that a forward flow of fluid is taking place in the check-valve in the associated conduit.

12. In a refrigerating apparatus of the absorption type, the combination of a pair of generator-absorbers, discharge and return conduits for each generator-absorber, means for heating said generator-absorbers in alternation comprising a movable heating member and means for moving it from heating position adjacent one generator-absorber to heating position adjacent the other, means for bringing cooling fluid to each generator-absorber in alternation, means for controlling the last named means by the heating member, a pair of receptacles each adapted to catch cooling fluid when one of the generator-absorbers is being cooled, means carrying said receptacles and connected with the heating member, means for holding the receptacles in their receiving positions respectively, thereby bringing the heating member adjacent the opposite generator-absorber, and means controlled by the conditions in the generator-absorber for releasing said holding means to allow the weight of the water in the receptacle in the receiving position to shift the burner by moving the receptacles.

13. In an automatic refrigerating apparatus of the kind described including generator-absorbers arranged in pairs, means for heating said generator-absorbers in alternation comprising a burner adapted to shift from heating position under one generator-absorber to heating position under the other generator-absorber, means for staying the position of said burner at a point intermediate its heating positions under said generator-absorbers, a valve for supplying fuel to said burner, automatic means for closing said valve when said burner leaves the heating position under either generator-absorber and means for supplying continuously a limited amount of fuel to said burner.

14. In an automatic refrigerating apparatus of the absorption type, including generator-absorbers arranged in pairs, means providing conduits leading the generated fluid from each of the generator-absorbers, and means providing return conduits for leading the expanded fluid back to each of the generator-absorbers, means for heating the generator-absorbers in alternation consisting of a burner member adapted to be shifted from heating position under one generator-absorber to heating position under the other generator-absorber, an arcuate plate made rigid with said burner and provided with oppositely facing shoulders, stop devices associated with each generator-absorber adapted to engage said shoulders when the burner is in heating position under the associated generator-absorber, and thermostatic devices, one associated with each generator-absorber, adapted for raising said stop devices from the path of said shoulders when said generator-absorbers have been raised to a predetermined temperature, and means for shifting said burner when said stop devices have released said shoulders.

15. In a refrigerating apparatus of the absorption type, the combination of a pair of generator-absorbers adapted to be heated in alternation, means for supplying a cooling agent, a shiftable burner adapted to heat each of the generator-absorbers, receptacles connected with the burner, shiftable means for controlling the cooling agent, means for holding the receptacles in position while they fill with water, and means for releasing the holding means whereby the weight of water in one of the receptacles will cause a movement of the burner and shifting means controlling the cooling agent.

16. In a refrigerating apparatus, the combination with a generator-absorber, of a discharge conduit therefor, a return conduit, means for heating and cooling said generator-absorber in alternation, valves located in each of said conduits, and thermostatically controlled means acting positively to seat the valves in the conduits, the last named means being operated by the heating means.

In testimony, that we claim the foregoing as our invention, we affix our signatures in the presence of two witnesses, HARRISON H. SOUTHWORTH at Cleveland, Ohio, this 4th day of October, A. D. 1912, and FRED W. WOLF, at Chicago, Illinois, this 21st day of October, A. D. 1912.

HARRISON H. SOUTHWORTH.
FRED W. WOLF.

Witnesses to the signature of Harrison H. Southworth:
    CLARENCE E. MEHLHOPE,
    S. F. SELFRIDGE.

Witnesses to the signature of Fred W. Wolf:
    GEORGE WILKINS,
    KARL W. DALL.